Jan. 16, 1934.     F. L. BROWN     1,943,366
MOTION PICTURE GATE
Filed Aug. 18, 1931

INVENTOR
FREEMAN L. BROWN
BY
ATTORNEY

Patented Jan. 16, 1934

1,943,366

UNITED STATES PATENT OFFICE 1,943,366

MOTION PICTURE GATE

Freeman L. Brown, Oaklyn, N. J., assignor to Radio Corporation of America, a corporation of Delaware Application August 18, 1931. Serial No. 557,818

4 Claims. (Cl. 88—17)

This invention relates to film gates for use in motion picture and like apparatus, and has for its principal object the provision of an improved film guiding mechanism which is readily adjusted to permit threading of the film and produces a smooth equal pressure whereby the film is maintained in close contact with the gate shoes and undesired vibration of the film is obviated.

Various types of mechanisms have been provided in the past for preventing sidewise and other undesired movement of the film as it moves past the projection or exposure aperture. Many of these mechanisms have included a pair of shoes or wearing plates fixed to the frame of the apparatus and arranged to cooperate with a pair of movable pressure shoes for gripping the opposite edges of the film more or less tightly to ensure that it does not wobble or weave as it passes the exposure aperture. In the operation of these mechanisms, difficulty is sometimes encountered due to the fact that the pressure on the film edges is uneven and is not readily adjusted to the value required for smooth operation of the film.

In accordance with the present invention, this difficulty is avoided by the provision of a pair of curved shoes or wearing strips arranged to cooperate with a pair of flexible pressure shoes which are equalized as to pressure and are so arranged that they may be readily adjusted to apply any desired pressure evenly along the edge of the film. While the invention is described as applied to a motion picture projector, it will be apparent that it is equally useful in the reproduction of sound from photographic sound records and for like purposes.

The invention will be better understood from the following description when considered in connection with the accompanying drawing and its scope will be pointed out in the appended claims.

Figure 1:
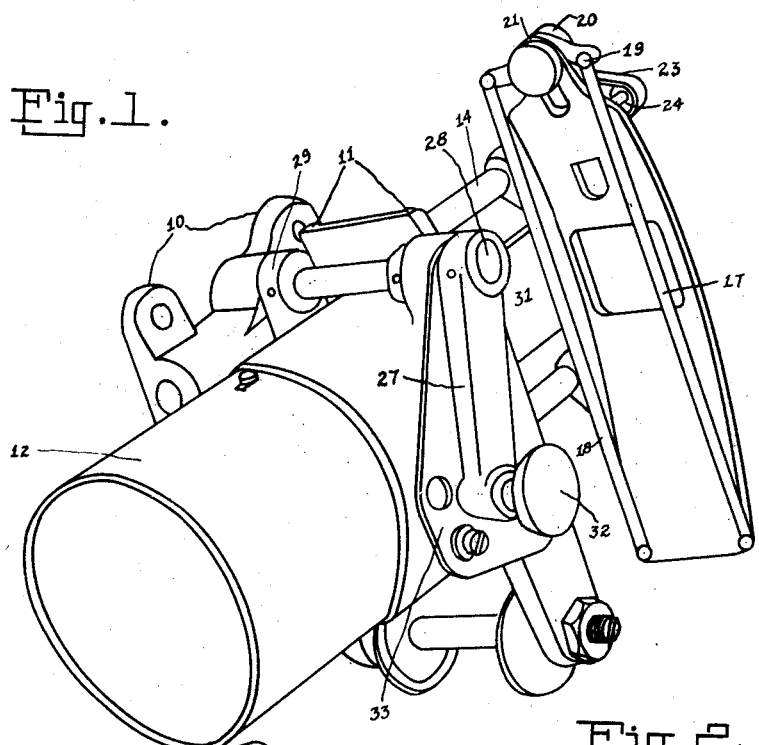
Figure 2:
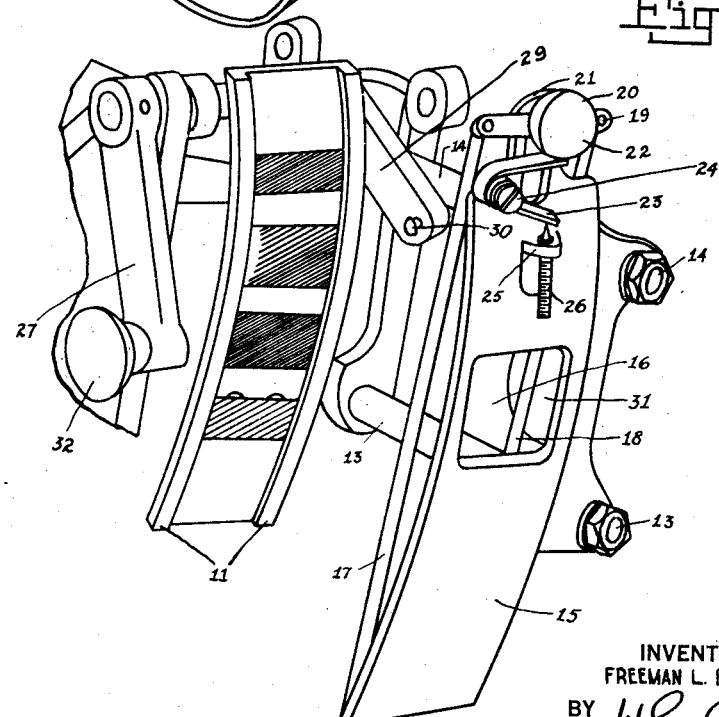

Referring to the drawing, Fig. 1 is a perspective view of a gate and gate control mechanism constructed in accordance with the invention, and Fig. 2 is a different view of the apparatus, the coupling between the support and movable sound gate being disconnected to permit a clearer view of the various parts.

This apparatus includes a support member 10 upon which are mounted a pair of fixed shoes or wearing strips 11 and an aperture member 12. Also mounted on the support are a pair of guide members 13 and 14 arranged to support a movable pressure shoe member 15. This member 15 is provided with an exposure aperture 16 and with a pair of flexible pressure shoes 17 and 18. It will be observed that the flexible shoes 17 and 18 are fixed to the support 15 at one of their ends and at the other of their ends are fixed to a yoke member 19 pivoted about a pin 20. The pin 20 extends through a slot in an extension 21 of the support 15 and is provided at its opposite ends with heads or nuts, one of which rests on a spring support 23 pivoted to the support 15 about a screw 24 and arranged to apply tension to the flexible pressure shoes 17. For adjusting the magnitude of the tension applied to the shoes 17 and 18, a screw 26 threaded through a lug 25 on the support 15 and arranged to cooperate with the lower end of the spring 23 is provided.

Movement of the pressure shoe support along the rods 13 and 14 is effected by movement of a lever 27 fixed to a shaft 28 which is provided at its opposite end with a lever 29. It will be noted that the lever 29 is provided at its lower end with a pin which is adapted to move in a vertical slot in a lug 31 attached to the support 15. In Fig. 2 the pin 30, which cooperates with the slot in the member 31 for moving the support 15, is shown withdrawn from the slot to permit the member 15 to be separated from the shoes 11 a sufficient distance to permit a clear view of certain details. It will be understood, of course, that in the normal open position of the gate the distance between the fixed and movable shoes is much less than that illustrated.

The gate is opened and closed by movement of the lever 27, the end of which is provided with a knob 32 and a spring controlled pin arranged to cooperate with holes in the member 33 for locking the gate in open and closed position.

It will be readily understood that the pressure with which the edges of the film are gripped between the fixed shoes or wearing plates 11 and the movable pressure shoes 17 and 18 when the gate is closed is equalized by the pivotal support 22 and that its magnitude is readily controlled by adjustment of the screw 26. The flexible shoes are preferably made of thin steel springs or other suitable material which has a smooth surface and passes the desired resiliency. Other means may of course be provided for adjusting the tension of the flexible pressure shoes.

I claim:

1. A film gate including a supporting member, a pair of flexible shoes fixed to said member at one of their ends and connected to a pivotal support at the other of their ends, and means for adjusting the position of said pivotal support to vary the tension applied to said shoes.

2. A film gate including a supporting member, a pair of flexible shoes fixed to said member at one of their ends and connected to a pivotal support at the other of their ends, and a resilient member upon which said pivotal support rests.

3. A film gate including a supporting member, a pair of flexible shoes fixed to said member at one of their ends and connected to a pivotal support at the other of their ends, a resilient member upon which said pivotal support rests, and means for adjusting the pressure applied to said pivotal support through said resilient member.

4. A film gate including a supporting member, a pair of thin steel spring shoes fixed to said member at one of their ends and connected to a pivotal support at the other of their ends, and means for adjusting the position of said pivotal support to vary the tension applied to said shoes.

FREEMAN L. BROWN.